(12) United States Patent
Baldischweiler

(10) Patent No.: US 12,175,317 B2
(45) Date of Patent: Dec. 24, 2024

(54) CHIP BODY FOR A CHIP CARD, CHIP CARD, AND METHOD FOR PRODUCING A CHIP BODY

(71) Applicant: GIESECKE+DEVRIENT EPAYMENTS GMBH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/553,871

(22) PCT Filed: Apr. 6, 2022

(86) PCT No.: PCT/EP2022/025132
§ 371 (c)(1),
(2) Date: Oct. 4, 2023

(87) PCT Pub. No.: WO2022/214220
PCT Pub. Date: Oct. 13, 2022

(65) Prior Publication Data
US 2024/0111985 A1 Apr. 4, 2024

(30) Foreign Application Priority Data
Apr. 8, 2021 (DE) ............ 10 2021 001 816.8

(51) Int. Cl.
*G06K 19/077* (2006.01)
(52) U.S. Cl.
CPC .............. *G06K 19/07722* (2013.01)
(58) Field of Classification Search
CPC .......... G06K 19/07722; G06K 19/02
See application file for complete search history.

(56) References Cited

U.S. PATENT DOCUMENTS

| 2014/0361086 | A1* | 12/2014 | Finn | ............ B23K 26/362 235/492 |
| 2015/0206047 | A1* | 7/2015 | Herslow | ............ H01Q 7/06 235/492 |
| 2020/0250506 | A1 | 8/2020 | Lotya et al. | |
| 2020/0364527 | A1 | 11/2020 | Coleman | |

FOREIGN PATENT DOCUMENTS

WO 2021030646 A2 2/2021

OTHER PUBLICATIONS

International Search Report from corresponding PCT Application No. PCT/EP2022/025132, Aug. 1, 2022.
German Search Report from corresponding DE Application No. 102021001816.8, Nov. 9, 2021.

* cited by examiner

*Primary Examiner* — Jamara A Franklin
(74) *Attorney, Agent, or Firm* — Workman Nydegger

(57) ABSTRACT

A card body for a chip card, having two metal layers, between which a nonconductive central layer is arranged, wherein a module opening for receive a chip module is already produced in one metal layer and in the aforementioned metal layer or can still be produced in a module opening zone, and two slots, one of which extends from the peripheral surface of the card body to the module opening or to the module opening zone in a metal layer and severs each of the metal layers at a respective height. The entry angle of the two slots into the metal layer does not equal 90° relative to the surface of the metal layer in each case, and the two slots have opposite inclinations relative to a surface normal of the surface of the metal layer.

15 Claims, 3 Drawing Sheets

CHIP BODY FOR A CHIP CARD, CHIP CARD, AND METHOD FOR PRODUCING A CHIP BODY

BACKGROUND

The invention relates to a card body for a chip card, to a chip card comprising a card body and to a method for producing a card body for a chip card.

Data carriers in the form of cards, in particular chip cards, are used in many fields, for example to carry out cashless payment transactions, as identity documents or to verify access authorizations. A chip card has a card body and an integrated circuit, for example in the form of a chip module with a chip, embedded into the card body. The chip module is conventionally inserted into a cavity or a module opening of the card body.

Card bodies, or chip cards, with externally lying metal layers, also known as metal face cards, will be considered. The energy coupling of DI systems with a double coil system (DCS) is carried out using metal structures with a slit, in which the magnetic flux/flow of the current in the metal faces is diverted. In this way, the slit prevents a short-circuit current. Such a slit needs to be provided in both externally lying metal layers, which leads to a reduced mechanical stability of the chip card, or of the card body. Since the cut reaches as far as the module opening, damage to the module may also occur for example due to shear forces.

SUMMARY

It is therefore an object of the present invention to improve the stability of the card body and of the chip card in the region of the slit.

This object is achieved by a card body for a chip card, by a chip card comprising a card body and by a method for producing a card body for a chip card according to the independent patent claims. Configurations and developments of the invention are specified in the dependent claims.

A card body according to the invention for a chip card comprises
- two metal layers, between which a nonconductive central layer is arranged, wherein a module opening for receiving a chip module is already created in one metal layer and the central layer or can still be created in a module opening zone, and
- two slits, one of which respectively extends in a metal layer from a peripheral face of the card body to the module opening or to the module opening zone and respectively divides the metal layer at a height,
- wherein entry angles of the two slits into the metal layer are respectively not equal to 90° with respect to a surface of the metal layer, and
- wherein the two slits have an opposite inclination with respect to a surface normal of the surface of the metal layer.

It is an underlying concept of the present invention that the slits in the metal layers or metal bodies are no longer formed perpendicularly to the surface but at an angle different to 90°. Expressed another way, the slit runs obliquely with respect to the surface on the surface of the metal layer. This leads to an overlap in a direction perpendicular to the surface of the regions of the metal layer which are separated by the slit.

By this overlap within a metal layer, a shear movement may be prevented in one direction. Since the two metal layers each have a slit and the two slits are configured so that they are rotated relative to one another, shear movements are suppressed in both directions.

The two slits have an opposite inclination with respect to a surface normal of the surface of the metal layer, so that a point of intersection of continuations of the two slits lies in the card body or in a plane or continuation of the card body.

A card body is intended here to mean a semifinished product for a chip card, into which a chip module has not yet been inserted. The module opening for the chip module may likewise not yet have been excavated in the card body. The chip module is inserted into the module opening on one side of the chip card. The module opening reaches only partially into the central layer of the chip card, so that the opposite metal layer may have a module opening into which a chip module is not however inserted. The recesses, that is to say the slit and module opening, of both metal layers may therefore be identical.

Alternatively, only the slit in the opposite metal layer may be present. The slit then extends lengthwise as far as a module opening zone, which corresponds to the opposite module opening. The slit may reach as far as a start, an end or a central region of this module opening zone. In particular, the slit may have a length of the opposite slit plus the module opening.

With the slits proposed here, on the one hand the card body is stabilized in respect of shearing. Furthermore, they offer the advantage that the penetration depth into the metal layer is reduced significantly in comparison with a perpendicular slit by the oblique entry of the slit. This leads to a superior visual appearance. Furthermore, the slit may now be filled with an adhesive or another material since the obliquely running slit prevents or at least substantially reduces any escape of the adhesive or of the material.

The slits proposed here therefore have the advantage that the mechanical or structural stability of the card body is improved by the opposite obliquely oriented configuration of the slits.

An entry angle of the slit into the metal layer is intended here to mean the angle of the slit with respect to the surface of the metal layer. This angle may also be referred to as an exit angle, since this angle is not restricted to any functionality in respect of an entry or exit.

The module opening is configured as a through-opening or as a blind hole in the surface of the metal layer. When the slit is made, either the module opening or the corresponding module opening zone, in which the module opening is subsequently formed, is present.

Provision may be made that the entry angle is less than or equal to 82°, preferably between 30° and 60°, and most preferably 45°. It has been found that, depending on the thickness or height of the metal layer and the slit width, such angles offer a good coverage of the regions of the metal layer which are separated by the slit. That is to say, the regions of the metal layer which are separated by the slit partially "overlap" one another as seen perpendicularly to the surface.

Provision may furthermore be made that the slit is formed by an interlock cut, which provides an overlap between two opposite walls of the slit. An interlock cut is intended here to mean a cut in which there is an overlap along the profile of the slit. This overlap prevents shearing or flexing of the card body in one direction. The two main directions in which shearing or flexing is intended to be prevented are the two normal vectors of the two surfaces of the card body, that is to say the two surfaces of the externally lying metal layers.

Provision may be made that the two entry angles are supplementary angles. For example, one entry angle may be 45° and the second entry angle, as a corresponding supplementary angle, may be 135°. The two entry angles are then equal but rotated by 180°. The two entry angles may likewise be different, in particular when the thicknesses of the metal layers are different. The entry angle may then be adapted to the conditions, such as thickness and/or material of the metal layer.

Provision may furthermore be made that the two slits have an identical entry angle, and that two metal layers are arranged rotated by 180° with respect to one another on the central layer. This allows simple manufacturing, in which identical metal layers may be manufactured. The slits may, for example, be created by means of laser-beam or water-jet cutting from a sheet having a thickness of between 50 μm and 300 μm.

Provision may be made that a width of the slit is less than or equal to 50 μm. The slit should be as thin as possible in order to achieve a good mechanical stability. At the same time, the slit should not be too thin in order to avoid contact with the walls of the slit, since this may lead to a short circuit.

Provision may furthermore be made that the central layer consists of plastic. For example, the central layer may be a plastic layer or a core of PVC, PE, PAL, PC or similar materials. Since the structural stiffness is provided by the two externally lying metal layers, the central layer does not need to satisfy particular requirements. The stiffness can be achieved in spite of the slits, since they are configured obliquely with respect to one another.

Provision may be made that the thickness of at least one metal layer is greater than or equal to 200 μm.

Provision may furthermore be made that a total thickness of the two metal layers is greater than a thickness of the central layer. The slits oriented obliquely with respect to one another allow thicker material layers, that is to say a thinner plastic core, since the latter no longer needs to stabilize the chip card.

Provision may be made that the thickness of a metal layer is less than or equal to 50 μm, and that the one metal layer is provided with at least one stamping. Such thin metal layers may be stamped, for example embossed. Visual and/or tactile identifiers may therefore be introduced into the metal layer.

Provision may furthermore be made that the two slits are not arranged along a direction of a surface normal of the surface of the metal layer. The slits are thus arranged offset with respect to one another. The slits are arranged in the region of a continuation of the module opening or of the module opening zone, so that at least one of the slits is connected to the module opening. If a module opening is not present in a metal layer, the slit of this metal layer may also lie outside the continuation of the module opening.

A chip card according to the invention comprises a card body as described above and a chip module at least partially embedded into the module opening of the card body. The same advantages and modifications as described above apply.

A method according to the invention for producing a card body for a chip card comprises the steps:
  providing two metal layers, wherein a module opening for receiving a chip module is already created in one metal layer or can still be created in a module opening zone, respectively creating a slit in the two metal layers, which slits extend from a peripheral face of the card body to the module opening or to the module opening zone and divide the metal layer at a height, and
  joining the two metal layers and a nonconductive central layer, which is arranged between the two metal layers, wherein entry angles of the slits into the metal layer are respectively not equal to 90° with respect to a surface of the metal layer, and wherein the two slits have an opposite inclination with respect to a surface normal of the surface of the metal layer.

The same advantages and modifications as described above apply.

Provision may be made that the joining is carried out by means of an adhesive, the slits being at least partially filled with the adhesive. The adhesive, which is still liquid or viscous during the joining, then runs into the obliquely configured slit. Because of the obliquity of the slit, the adhesive remains in the slit and does not escape. The adhesive, which then cures, holds the walls of the slit in position so that distortion or shearing of the card body, and therefore of the chip card, are made more difficult or prevented. Furthermore, the risk of a short circuit can be reduced further since contact of the walls of the slit is avoided by the adhesive.

Provision may furthermore be made that the module opening is not created until after the application of the plastic layers. The creation of the slit as proposed here may therefore be used in various phases of the production of a card body or of a chip card.

BRIEF DESCRIPTION OF THE DRAWINGS

The present invention will be described by way of example below with reference to the appended drawings, in which.

DETAILED DESCRIPTION OF VARIOUS EMBODIMENTS

Figure 1:
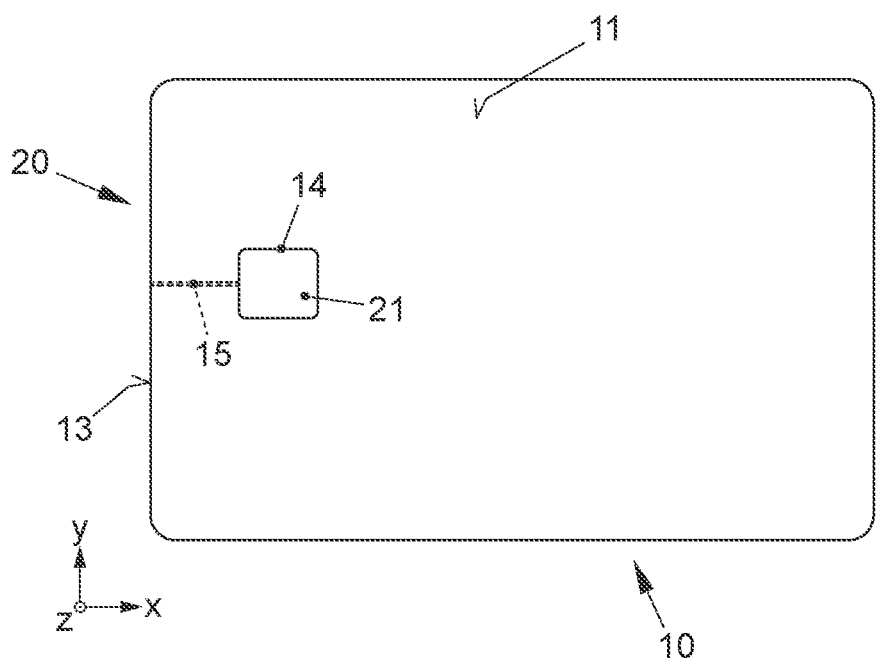
FIG. 1 shows a plan view of a chip body for a chip card.
Figure 2:
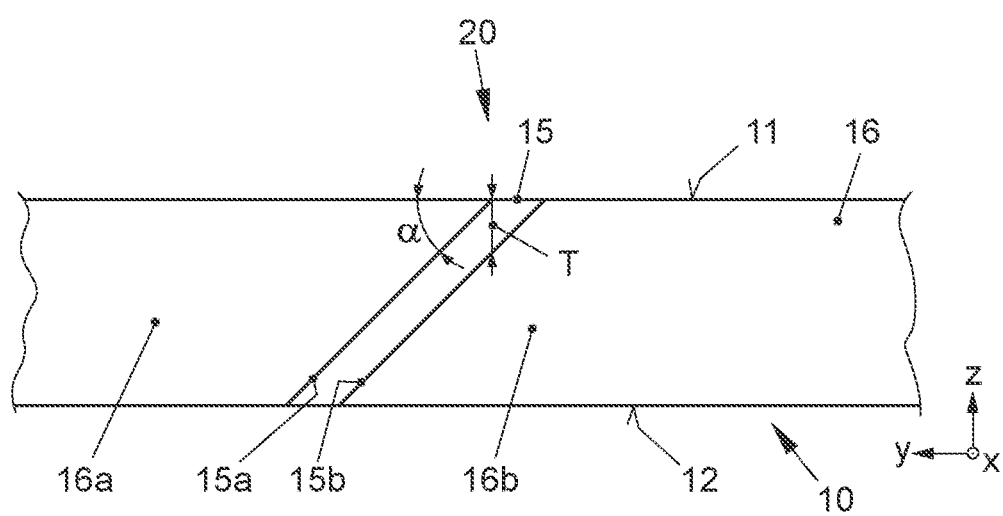
FIG. 2 shows a view of an end side of a metal layer of the card body.

FIG. 1 shows a chip card 20 having a card body 10. The card body 10 has a substantially rectangular basic shape with two opposite surfaces, of which one surface 11 may be seen in FIG. 1. The opposite other side 12 is represented in FIG. 2. The two surfaces 11, 12 run parallel to one another and are connected by a circumferential peripheral face 13.

The card body 10 has a rectangular shape in an x-y plane, in which the peripheral face 13 lies with two longitudinal faces running in the x direction and two end faces running in the y direction. The thickness or height of the card body 10 runs in the z direction.

A module opening 14 for a chip module 21 is excavated in the surface 11 of the card body 10. The module opening 14 extends into the card body 10. The module opening 14 is, for example, created by means of a laser working step or a milling working step. The chip module 21 is inserted into the module opening 14, and is for example adhesively bonded there.

The chip module 21 may comprise a contact surface structure, which carries a coil. The chip module 21 may furthermore comprise a chip, which is for example fastened in an encapsulation compound on a lower side of the contact surface structure. The chip is supplied with energy and/or signals by means of the coil. An electromagnetic field may thus be coupled into the coil.

Provided in the card body 10, there is a slit 15 which extends from the peripheral face 13, or in other words from an outer edge of the card body 10, to the module opening 14. The slit 15 therefore connects the module opening 14 to the peripheral face 13. The slit 15 is used to avoid short-circuit currents, or eddy currents.

The slit 15 runs in the y direction, that is to say parallel to the longitudinal face. The slit 15 has for example a width of between 30 μm and 100 μm, preferably between 50 μm and 80 μm. In FIG. 1, the slit 15 is represented on a left side. The slit 15 may also be arranged on a right, upper or lower side of the card body 10.

FIG. 2 shows a view of an end side of a metal layer 16 of the card body 10. The metal layer 16 is an externally lying metal layer, or a metal plate. Accordingly, the chip card 20 is a so-called metal face card.

It may be seen that the slit 15 fully divides the metal layer 16 in thickness or height, that is to say in the z direction. The slit 15 therefore connects the two surfaces 11 and 12. The slit 15 reaches as far as the module opening 14 in the x direction.

An entry angle α of the slit 15 with respect to the surface 11, and similarly with respect to the surface 12, is not equal to 90°.

In FIG. 2, the slit 15 is configured continuously at an angle of 45°. The entry angle α may for example be selected to be less than or equal to 82°, or between 30° and 60°. Depending on the selected side or wall of the slit 15, the entry angle α may be 45° or, as a corresponding supplementary angle, 135°.

The slit 15 is formed by an interlock cut, which provides an overlap or coverage between two opposite walls 15a and 15b of the slit 15. This overlap or coverage exists in the direction of a surface normal to the surface 11, or expressed another way in the direction of the thickness or height of the card body 10 or of the metal layer 16. In the figures, this is the z direction. The two walls 15a, 15b may run parallel.

The angles indicated above allow a sufficient overlap or coverage for the conventional thicknesses of the metal layer 16, for example between less than 50 μm and about 200 μm, and conventional cut widths of between 40 μm and 80 μm.

In the example represented in FIG. 2, the thickness or height of the metal layer 16 is 200 μm. With the entry angle α of 45°, a visible depth T is about 80 μm. The visible depth T is the distance from the wall 15b to the surface 11, as seen vertically or in the direction of the surface normal of the surface 11 at the entry point of the wall 15a. This visible depth T may, for example, be regarded as a measure of an overlap or coverage.

With its walls 15a and 15b, the slit 15 separates the metal layer 16 into two regions 16a and 16b, the region 16a lying on the side of the wall 15a and being bounded by the latter. Similarly, the region 16b lies on the side of the wall 15b and is bounded by the latter.

In the region of the slit 15, there is therefore an overlap or coverage of the two walls 15a and 15b and therefore of the two regions 16a and 16b of the metal layer 16. This overlap or coverage exists in the direction of surface normal of the surface 11. In the case of a cut, even a virtual cut, in the direction of the surface normal through the metal layer 16, there is therefore always a point of intersection with both walls 15a and 15b and therefore both regions 16a and 16b.

The overlap or coverage of the two walls 15a and 15b, or of the two regions 16a and 16b, now blocks the displacement of the region 16a over the region 16b. This corresponds to a compressive movement onto the region 16b in the z direction, that is to say a movement of the two walls 15a and 15b toward one another. The region 16b can only move a small distance, which corresponds approximately to the visible depth T. It then bears on the region 16a and is stopped by the latter. The obliquely configured slit 15 can therefore prevent an undesired shear movement of the card body 10 or of the metal layer 16.

If on the other hand the region 16b is moved away from the region 16a, which corresponds in FIG. 2 to a movement downward in the negative z direction, no blocking takes place.

The considerations above relating to the movement of the region 16b apply similarly for the region 16a, only with a correspondingly reversed movement.

Figure 3:
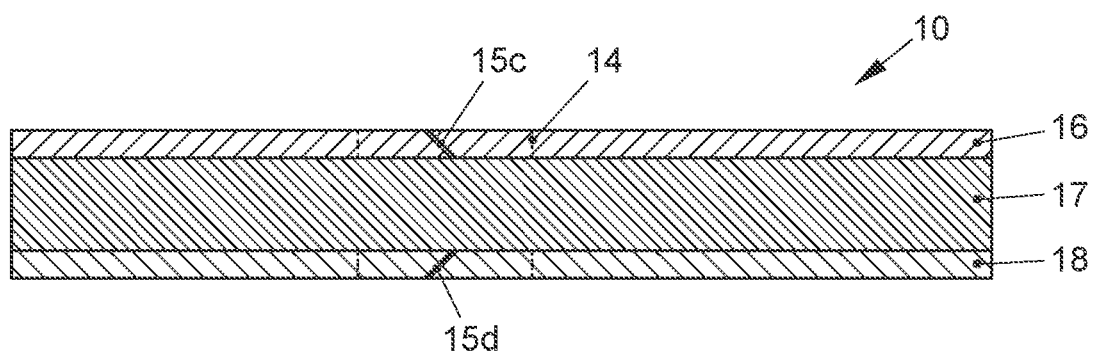
FIG. 3 shows a sectional representation of a card body.

FIG. 3 shows a sectional representation of a card body 10. The card body 10 comprises the metal layer 16 described above, a central layer 17 of a plastic, for example PVC, and a further metal layer 18. The three layers have, for example, been joined in a laminating process. The metal layer 18 represented here underneath may correspond to the metal layer 16 arranged above here. The comments above relating to the metal layer 16 also apply for the example represented in FIG. 3. These comments apply similarly for the further metal layer 18.

The total thickness or height of the card body 10 may, for example, be 750 μm. The thickness or height of each metal layer 16, 18 may lie between 50 μm and 250 μm. The two metal layers 16 and 18 may have an identical or different thickness. Provision may also be made that the total thickness of the two metal layers 16, 18 is greater than a thickness of the central layer 17.

The metal layer 16 comprises a slit 15c, which is arranged here centrally in the region of the module opening 14 or of the continuation thereof. The module opening 14 for the chip module extends here through the entire metal layer 16 and may be configured as a blind hole opening into the central layer 17. It may also not be created until later. The module opening 14 is, for example, made by means of a laser working step or a milling working step.

In this example, the slit 15c of the metal layer 16 has an angle of 45° with respect to a surface of the metal layer 16. This angle may be regarded as +45°.

The metal layer 18 comprises a slit 15d, which is likewise arranged here centrally in the region of the module opening 14 or of the continuation thereof. In this example, the slit 15d of the metal layer 18 has an angle of −45° with respect to a surface of the metal layer 16. With respect to the surface of the metal layer 18, the slit 15d of the metal layer 18 again has an angle of +45°. The two metal layers 16 and 18 may thus be configured identically and arranged rotated by 180° on the central layer 17.

Two slits 15c and 15d therefore have an opposite inclination with respect to a surface of the metal layer 16, so that a point of intersection of continuations of the two slits 15c and 15d lies in the card body 10 or in a plane or continuation of the card body 10.

In the region of the slit 15c and 15d, respectively, there is thus an overlap or coverage of the two walls of the slit 15c and 15d, and therefore of the two regions of the metal layer 16 or 18 which are separated by the respective slit. This overlap or coverage exists in the direction of the surface normal of the metal layer 16. In the case of a cut, even a virtual cut, in the direction of the surface normal through the card body 10, in this example there is therefore always a point of intersection with both walls of the slit 15c and with both walls of the slit 15d. Correspondingly, a shear movement of the card body may be prevented in both directions.

Figure 4:
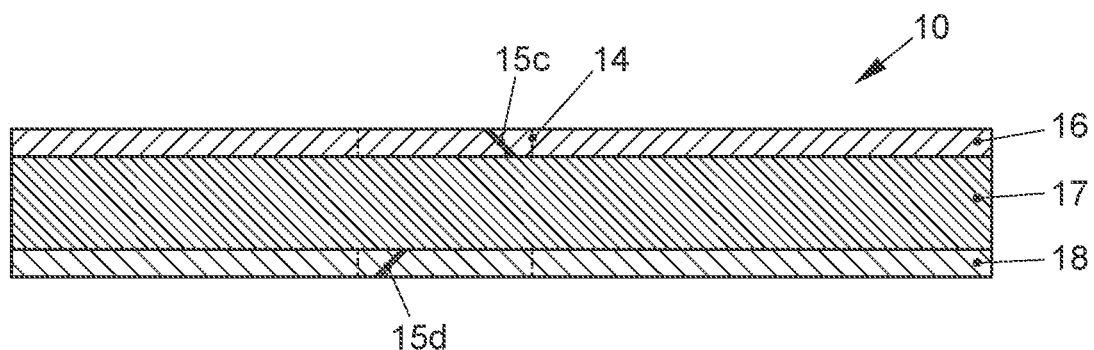
FIG. 4 shows a sectional representation of a card body.

FIG. 4 shows a sectional representation of a card body 10. The structure of the card body 10 represented here corresponds substantially to the structure of the card body represented in FIG. 3. Here again, there is a layer sequence of one central layer 17 with two surrounding metal layers 16 and 18.

The angles of the slits 15c and 15d correspond to those of the slits in FIG. 3. Here, however, the position of the two slits 15c and 15d is different. The two slits 15c, 15d again lie in the region of the module opening 14. However, the two slits 15c and 15d lie outside a midline of the module opening 14. This midline of the module opening 14 may also correspond to the midline of the card body 10.

According to FIG. 4, the slit 15c is arranged to the right of the midline and the slit 15d is arranged to the left of the midline. This arrangement may also be reversed. The two slits 15c, 15d may have an equal distance from the midline or, expressed another way, from the edges of the module opening 14.

With this arrangement of the two slits 15c and 15d, shear movements of the card body 10 may also be effectively suppressed in both directions.

Figure 5:
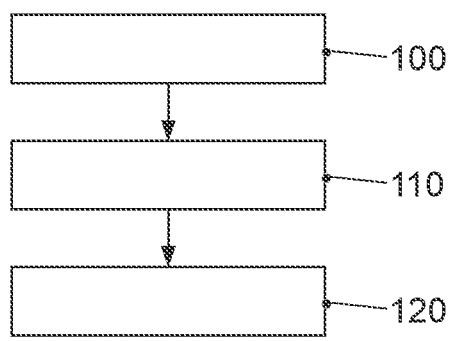
FIG. 5 shows a schematic representation of a method for producing a card body.

FIG. 5 shows a schematic representation of a method for producing a card body 10 for a chip card 20 as described above.

In a first step 100, two metal layers 16, 18 are provided; a module opening 14 for receiving a chip module 21 has already been created in a metal layer 16 or can still be or is still created in a module opening zone. Only one module opening may be provided, in which case a module opening is excavated only in one of the two metal layers 16 or 18.

In a second step 110, a slit 15 is respectively created in the two metal layers 16, 18, the slits extending from a peripheral face of the card body 10 is far as the module opening 14, or as far as the module opening zone, and fully dividing the metal layer 16, 18 at a height.

If the module opening 14 is intended to be produced in a subsequent manufacturing step, the slit is created as far as the corresponding module opening zone where the module opening is subsequently intended to be formed. If a module opening is not intended to be provided in one of the metal layers, the slit is formed as far as a module opening zone that lies opposite the module opening in the other metal layer. In this case, the slit may also be formed through the module opening zone.

The tool for creating the slit 15 is in this case directed onto the surface of the metal layer 16 or 18, specifically obliquely at an entry angle α.

The slit 15 is formed in such a way that an entry angle α of the slit into a surface is not equal to ninety degrees with respect to the surface. The slit 15 is formed entirely through the thickness of the metal layer 16 or 18.

Furthermore, the two slits 15 are excavated in the two metal layers 16 and 18 in such a way that the two slits 15 have an opposite inclination with respect to a surface normal of the surface of the metal layer, so that a point of intersection of continuations of the slits lies in the card body 10 or in a plane or continuation of the card body 10.

Optionally, for example if the slit 15 is cut with a laser, a focus of the tool or of the laser may be readjusted with an increasing cutting depth. The material removal may thus always be carried out at an optimal working point. Since the length of the slit 15 increases because of its oblique setting, it is always possible to cut optimally even in the event of a relatively long cut because of the readjustment.

In a third step 110, the two metal layers 16, 18 and a nonconductive central layer 17, which is arranged between the two metal layers 16, 18, are joined. This step may, for example, be carried out by lamination.

If an adhesive is used for the connection of the individual layers of the card body 10, the slit 15 may then be filled at least partially with the adhesive. The inner contour of the slit 15 at least partially prevents the adhesive from escaping, so that it remains in the slit 15. By the adhesive being cured in the slit, the card body 10 or the chip card 20 is stabilized further.

If the module opening 14 in the card body 10 is not produced until after the lamination, the adhesive which has flowed into the slit 15 and dried or cured there prevents swarf, which occurs during the creation of the module opening 14, from being able to settle in the slit 15 and being able to cause an electrical short circuit there.

The invention claimed is:

1. A card body for a chip card, having:
two metal layers, between which a nonconductive central layer is arranged,
wherein a module opening for receiving a chip module is already created in one metal layer and the central layer or can still be created in a module opening zone, and
two slits, one of which respectively extends in a metal layer from a peripheral face of the card body to the module opening or to the module opening zone and respectively divides the metal layer at a height,
wherein entry angles of the two slits into the metal layer are respectively not equal to 90° with respect to a surface of the metal layer, and
wherein the two slits have an opposite inclination with respect to a surface normal of the surface of the metal layer.

2. The card body according to claim 1, wherein the entry angle is less than or equal to 82°.

3. The card body according to claim 1, wherein the slit is formed by an interlock cut, which provides an overlap between two opposite walls of the slit.

4. The card body according to claim 1, wherein the two entry angles are supplementary angles.

5. The card body according to claim 1, wherein the two slits have an identical entry angle, and in that two metal layers are arranged rotated by 180° with respect to one another on the central layer.

6. The card body according to claim 1, wherein a width of the slit is less than or equal to 50 μm.

7. The card body according to claim 1, wherein the central layer consists of plastic.

8. The card body according to claim 1, wherein the thickness of at least one metal layer is greater than or equal to 200 μm.

9. The card body according to claim 1, wherein a total thickness of the two metal layers is greater than a thickness of the central layer.

10. The card body according to claim 1, wherein the thickness of a metal layer is less than or equal to 50 μm, and in that the one metal layer is provided with at least one stamping.

11. The card body according to claim 1, wherein the two slits are not arranged along a direction of a surface normal of the surface of the metal layer.

12. A chip card comprising a card body according to claim 1 and a chip module at least partially embedded into the module opening of the card body.

13. A method for producing a card body for a chip card, having the steps:

providing two metal layers, wherein a module opening for receiving a chip module is already created in one metal layer or can still be created in a module opening zone, respectively creating a slit in the two metal layers, which slits extend from a peripheral face of the card body to the module opening or to the module opening zone and divide the metal layer at a height, and joining the two metal layers and a nonconductive central layer, which is arranged between the two metal layers, wherein entry angles of the slits into the metal layer are respectively not equal to 90° with respect to a surface of the metal layer, and wherein the two slits have an opposite inclination with respect to a surface normal of the surface of the metal layer.

14. The method for producing a card body according to claim 13, wherein the joining is carried out by means of an adhesive, the slits being at least partially filled with the adhesive.

15. The method for producing a card body according to claim 13, wherein the module opening is not created until after the joining.

\* \* \* \* \*